(12) United States Patent
Kulkarni et al.

(10) Patent No.: US 12,695,664 B2
(45) Date of Patent: Jul. 28, 2026

(54) SYSTEMS AND METHODS FOR ESTABLISHING A PREFERRED NETWORK

(71) Applicant: Apple Inc., Cupertino, CA (US)

(72) Inventors: Bharat V Kulkarni, Santa Clara, CA (US); Venkateswara Rao Manepalli, San Jose, CA (US); Vidyuth Chikoti, Newark, CA (US); Manuel Roman Cuesta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 18/235,140

(22) Filed: Aug. 17, 2023

(65) Prior Publication Data

US 2024/0388500 A1 Nov. 21, 2024

Related U.S. Application Data

(60) Provisional application No. 63/467,078, filed on May 17, 2023.

(51) Int. Cl.
| | |
|---|---|
| *G06F 15/177* | (2006.01) |
| *H04L 12/18* | (2006.01) |
| *H04L 41/0806* | (2022.01) |
| *H04W 48/16* | (2009.01) |
| *H04W 84/18* | (2009.01) |

(52) U.S. Cl.
CPC ........ *H04L 41/0806* (2013.01); *H04L 12/185* (2013.01); *H04W 48/16* (2013.01); *H04W 84/18* (2013.01)

(58) Field of Classification Search
CPC .. H04L 41/0806; H04L 12/185; H04W 48/16; H04W 84/18

USPC .......................................................... 709/222
See application file for complete search history.

(56) References Cited

U.S. PATENT DOCUMENTS

| | | | | |
|---|---|---|---|---|
| 8,593,973 | B2 * | 11/2013 | Shukla ................. | H04L 5/0085 |
| | | | | 370/242 |
| 9,084,081 | B2 * | 7/2015 | Gupta ................. | H04L 63/0428 |
| 9,557,889 | B2 | 1/2017 | Raleigh et al. | |
| 9,713,003 | B2 * | 7/2017 | Kim .................... | H04L 63/0876 |
| 9,900,444 | B1 * | 2/2018 | Seetharaman .... | H04M 15/8044 |
| 9,980,194 | B2 | 5/2018 | Upp et al. | |
| 10,117,160 | B2 * | 10/2018 | Zhu ....................... | H04W 48/16 |
| 10,194,370 | B2 * | 1/2019 | Huang ................. | H04W 40/20 |

(Continued)

FOREIGN PATENT DOCUMENTS

| | | |
|---|---|---|
| CA | 2872882 C | 9/2018 |

*Primary Examiner* — Alicia Baturay
(74) *Attorney, Agent, or Firm* — FLETCHER YODER PC

(57) ABSTRACT

One or more tangible, non-transitory computer-readable media storing instructions that, when executed by one or more processors, are configured to cause the one or more processors to receive an indication of a location of an electronic device, receive credentials from a password management system of the electronic device for a preferred network and the location based on the location corresponding to the preferred network. The instructions, when executed by the one or more processors, may also cause the processors to create the preferred network and the credentials, and store the preferred network, the location, and the credentials in the password management system based on the location not corresponding to the preferred network, and communicate using the preferred network based on the credentials.

20 Claims, 6 Drawing Sheets

(56) References Cited

U.S. PATENT DOCUMENTS

| | | | |
|---|---|---|---|
| 10,200,283 B2 * | 2/2019 | Hui | H04L 47/29 |
| 10,237,900 B2 * | 3/2019 | Jackson | H04W 4/38 |
| 10,244,564 B2 * | 3/2019 | Jackson | G08B 25/10 |
| 10,320,578 B2 | 6/2019 | Sabharwal | |
| 10,397,777 B2 * | 8/2019 | Kumar | H04B 10/116 |
| 10,462,053 B2 * | 10/2019 | Hui | H04L 47/24 |
| 10,548,173 B2 * | 1/2020 | Jackson | H04L 67/10 |
| 10,848,936 B2 * | 11/2020 | Bhaskaran | H04W 4/40 |
| 11,190,436 B2 * | 11/2021 | Venugopal | H04L 45/10 |
| 11,297,661 B2 * | 4/2022 | Jackson | G08G 1/0965 |
| 11,425,024 B2 * | 8/2022 | Venugopal | H04L 45/121 |
| 11,510,245 B2 * | 11/2022 | Dass | H04W 74/0808 |
| 11,523,254 B2 * | 12/2022 | Deixler | G01S 7/006 |
| 11,605,973 B2 * | 3/2023 | Susilo | H02J 3/008 |
| 11,683,235 B2 * | 6/2023 | Hayes | H04L 67/12 370/254 |
| 11,720,504 B2 * | 8/2023 | Manepalli | H04L 41/12 711/163 |
| 11,722,377 B2 * | 8/2023 | Hayes | H04L 67/12 |
| 11,902,874 B2 * | 2/2024 | Deixler | H04L 45/22 |
| 12,041,513 B2 * | 7/2024 | Deixler | H04W 4/80 |
| 12,199,826 B2 * | 1/2025 | Hayes | H04L 67/12 |
| 12,206,556 B2 * | 1/2025 | Bhutani | H04L 67/12 |
| 12,231,296 B2 * | 2/2025 | Bhutani | H04L 67/12 |
| 12,309,859 B2 * | 5/2025 | Dass | H04W 76/15 |
| 2002/0044549 A1 * | 4/2002 | Johansson | H04W 40/32 370/386 |
| 2003/0046426 A1 * | 3/2003 | Nguyen | H04L 41/083 709/224 |
| 2016/0269984 A1 * | 9/2016 | Hallett | H04W 76/10 |
| 2022/0065484 A1 | 3/2022 | Smirnova et al. | |
| 2022/0067232 A1 | 3/2022 | Hunt et al. | |
| 2022/0337982 A1 * | 10/2022 | Bhaskaran | G06F 16/29 |
| 2023/0128225 A1 * | 4/2023 | Xiang | H04W 36/14 370/329 |
| 2023/0199610 A1 * | 6/2023 | Hui | H04L 12/2807 370/328 |
| 2023/0231849 A1 * | 7/2023 | Xiang | H04W 12/069 726/7 |
| 2024/0107544 A1 * | 3/2024 | Mahasenan | H04W 72/23 |
| 2024/0121708 A1 * | 4/2024 | Burgarella | H04W 48/18 |
| 2024/0205728 A1 * | 6/2024 | Zhu | H04W 8/18 |
| 2024/0334508 A1 * | 10/2024 | Johnson | H04W 12/50 |
| 2024/0430797 A1 * | 12/2024 | Mahasenan et al. | H04L 12/185 |
| 2025/0071678 A1 * | 2/2025 | Mahasenan | H04W 52/0229 |

* cited by examiner

SYSTEMS AND METHODS FOR ESTABLISHING A PREFERRED NETWORK

CROSS-REFERENCE TO RELATED APPLICATIONS

This application claims priority to and the benefit of U.S. Provisional Application No. 63/467,078, filed May 17, 2023, entitled "SYSTEMS AND METHODS FOR ESTABLISH-ING A PREFERRED NETWORK," the disclosure of which is incorporated by reference in its entirety.

BACKGROUND

The present disclosure relates generally to wireless com-munication, and more specifically, to a wireless mesh net-work.

In a wireless mesh network (e.g., a Thread network), electronic devices may couple directly, dynamically, and non-hierarchically to other electronic devices to cooperate with one another to route data to and from devices. However, if an electronic device cannot join an existing network (e.g., because a routing device, such as a border router, is missing or inoperable), the electronic device may create its own network, separate from the existing network. This may occur repeatedly as more electronic devices attempt to join the existing network. As a result, electronic devices may create or join multiple, separate networks, and be unable to com-municate with the electronic devices of the existing network and/or other separate networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, one or more tangible, non-transitory computer-readable media storing instructions that, when executed by one or more processors, are configured to cause the one or more processors to receive an indication of a location of an electronic device, receive credentials from a password management system of the electronic device for a preferred network and the location based on the location corresponding to the preferred network. The instructions, when executed by the one or more processors, may also cause the processors to create the preferred network and the credentials, and store the preferred network, the location, and the credentials in the password management system based on the location not corresponding to the preferred network, and communicate using the preferred network based on the credentials.

In another embodiment, a method may receive a first network signature and receive one or more preferred net-work entries from a password management system, wherein the one or more preferred network entries include a pre-ferred network entry having a second network signature. The method may then add a new preferred network entry includ-ing the first network signature to update the one or more preferred network entries based on the one or more preferred network entries not corresponding to the first network sig-nature.

In yet another embodiment, an electronic device may include a transmitter, a receiver, a memory storing a password management system, and one or more processors communicatively coupled to the transmitter, the receiver, and the memory. The one or more processors may receive, via the receiver, a first indication of whether a first preferred network is available at a first location, receive from the password management system first credentials for the first preferred network and the first location based on the first preferred network being available at the first location, and communicate, via the transmitter or the receiver, using the first preferred network and the first credentials. The one or more processors may also receive, via the receiver, a second indication of whether a second preferred network is avail-able at a second location, receive second credentials from the password management system for the second preferred network at the second location based on the second preferred network being available at the second location, and com-municate, via the transmitter or the receiver, using the second preferred network based on the second credentials Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclo-sure without limitation to the claimed subject matter.

BRIEF DESCRIPTION OF THE DRAWINGS

Various aspects of this disclosure may be better under-stood upon reading the following detailed description and upon reference to the drawings described below in which like numerals refer to like parts.

DETAILED DESCRIPTION OF SPECIFIC EMBODIMENTS

Figure 1:
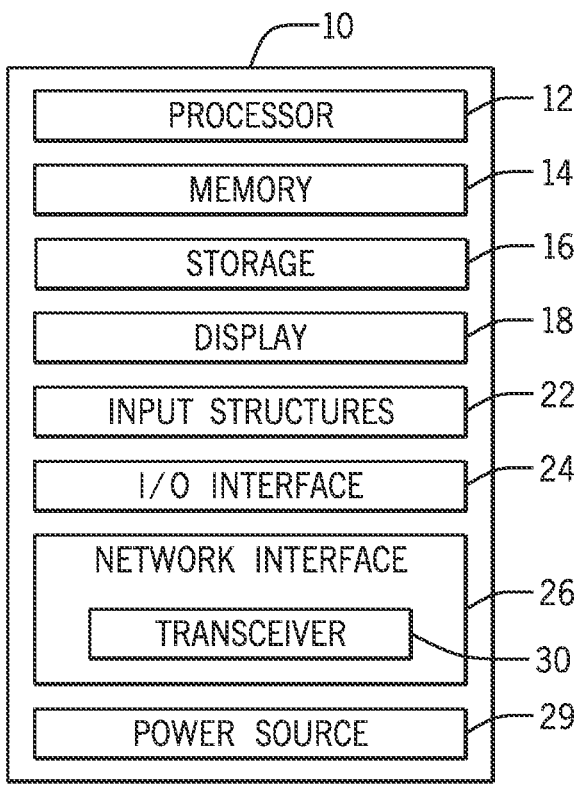
FIG. 1 is a block diagram of an electronic device, accord-ing to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

The present disclosure relates to techniques for managing a wireless mesh network, such as a Thread network. For example, a router of the wireless mesh network (e.g., a Leader of a Thread network) may create network credentials for the network, where the network is disposed at a location. An electronic device joining the network may receive the network credentials from the network and store the network credentials in a password management system. The electronic device may subsequently use the network credentials to join the network. Moreover, the network may be designated as a preferred network for the electronic device at the location.

When there is no pre-existing network (e.g., a user is setting up a device for the first time), the electronic device may create a new network with corresponding new network credentials. Further, the new network credentials for the new network may be stored in the password management system of the electronic device and designated as the preferred network for the respective location. Therefore, the network credentials may be requested by any number of additional electronic devices the user may wish to join the preferred network at a subsequent time. As such, the present techniques may prevent the creation of separate, disjointed networks and enable any number of electronic devices to join the preferred network more efficiently. Further, the present techniques may enable the number of electronic devices to communicate via a single network.

In one embodiment, the user may physically move the electronic device from a first location, with an existing preferred network, to a second location. The electronic device may then determine if a new network exists in the second location. If the new network exists, the electronic device may receive the new network credentials from the new network and store the new network credentials in the password management system. Further, the electronic device may use the new network credentials to join the new network. Thus, the new network may be designated as the preferred network for the electronic device at the second location. However, if the new network does not exist in the second location, the new network may be created in the second location by the electronic device. Moreover, the new network credentials associated with the new network may be stored in the password management system, and the new network may be designated as the preferred network for the second location.

In another embodiment, multiple electronic devices may be joined to the preferred network in the first location. The user may physically move the multiple electronic devices coupled to the preferred network from the first location to the second location. Thus, the preferred network may be created at the second location using the same network credentials as the preferred network in the first location. However, a network signature indicative of the first location may be updated to correspond to the second location. That is, the network signature may be updated to correspond to a current network (of a router) the electronic device is coupled to at the second location. The network signature may be based on, for example, an Internet Protocol (IP) address (e.g., Internet Protocol version 4 (IPv4), Internet Protocol version 6 (IPv6)), a Media Access Control (MAC) address, or any other suitable address format. In this manner, the multiple electronic devices may be maintained on the same preferred network.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), a smart speaker, home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), a smart appliance (e.g., refrigerator, dishwasher, washer, dryer, etc.), smart door lock, and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

The memory 14 may include a password management system 58. The password management system 58 may securely store data such as usernames, passwords, network credentials, secure notes, and/or other sensitive information. The password management system 58 may be associated with an identifier (ID) (e.g., account name, login, or the like) and a password. The electronic device 10 may access the password management system 58 by inputting the ID and the password. In some embodiments, the password management system 58 may include cloud-based storage. That is, if the cloud-based storage is enabled, data stored in the password management system 58 may be synchronized across additional electronic devices over one or more networks associated the ID and the password. The password management system 58 may include Keychain (as developed by Apple), a credential manager, or any other suitable password manager that may be implemented on the electronic device 10.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a wireless mesh network, a low-rate wireless personal area network (LR-WPAN), an ultra-wideband (UWB) network, a BLUETOOTH® network, a local area network (LAN) or wireless local area network (WLAN), such as a network employing one of IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
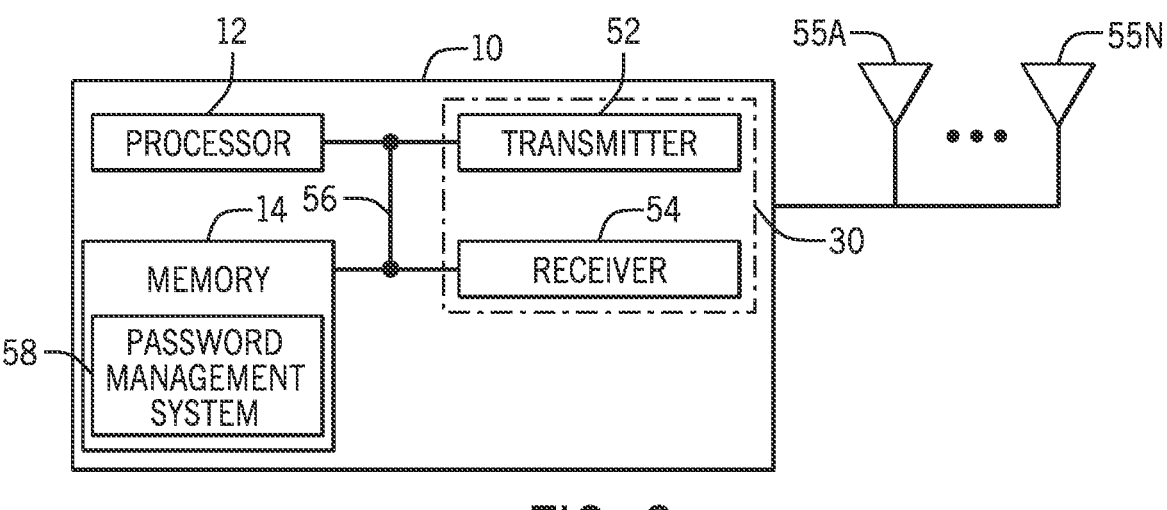
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
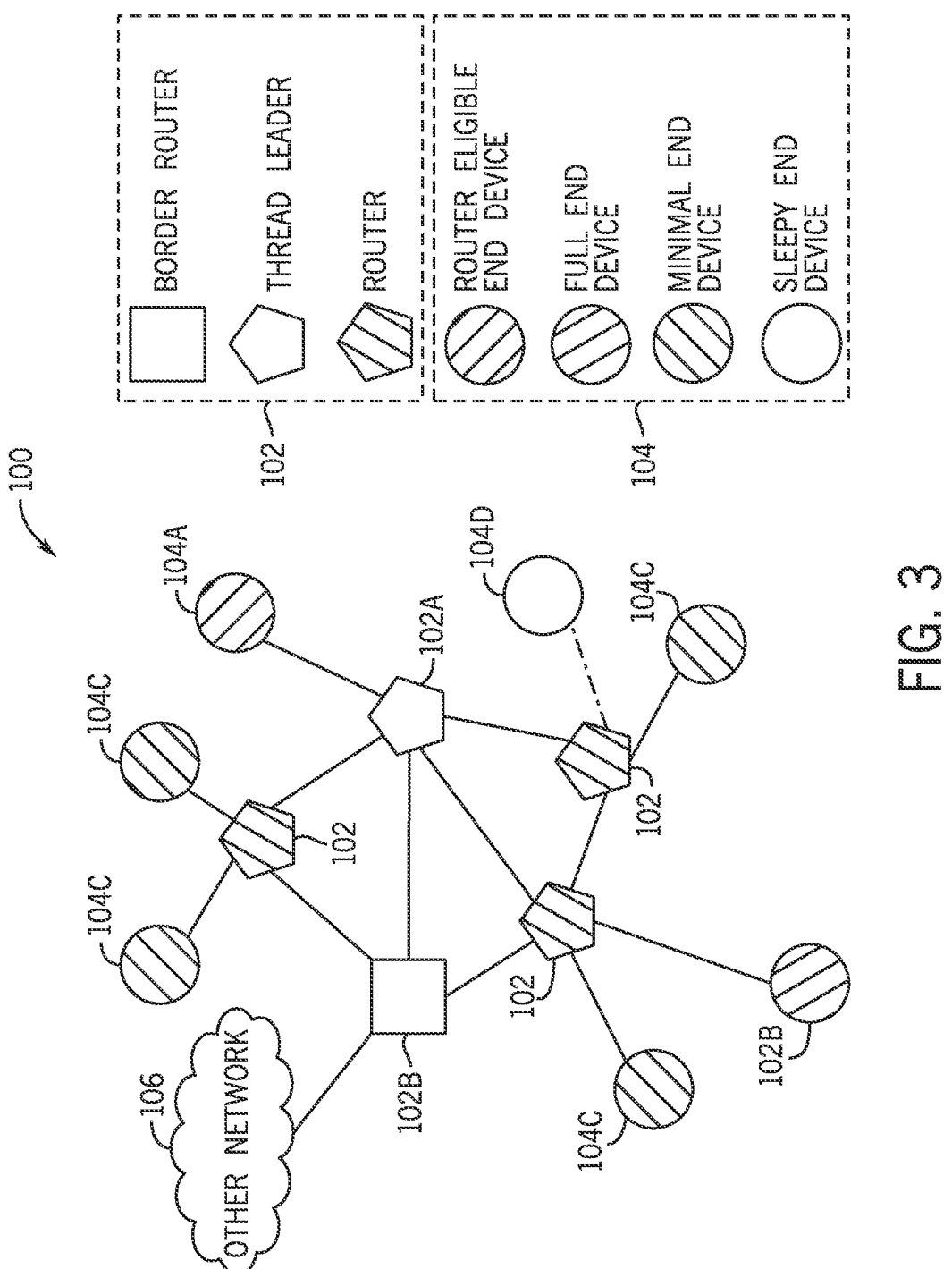
FIG. 3 is a schematic diagram of a wireless mesh network that may include the electronic device of FIG. 1, according to embodiments of the present disclosure.

FIG. 3 is a schematic diagram of a wireless network 100 in which the electronic device 10 may be coupled. In particular, the wireless network 100 may include a wireless mesh network or a LR-WPAN, and, even more particularly, a Thread network. While the techniques described herein may be described with respect to the Thread network, it should be noted that the techniques may be utilized with other types of wireless networks, including, but not necessarily limited to, any IEEE Standard 802.15.4 network, such as a ZigBee network. For example, the techniques of the present disclosure may be utilized in a wireless mesh network, which generally refers to a wireless network that utilizes a mesh topology. For instance, a wireless mesh network may follow a WLAN topology in which the nodes (e.g., devices coupled to the mesh network) couple directly, dynamically, and non-hierarchically to other nodes (e.g., as many nodes as possible) and cooperate with one another to route data to and from devices. Wireless mesh networks include, but are not limited to, IEEE Standard 802.15.4 networks.

The wireless network 100 includes several nodes (e.g., routers 102 and end devices 104) that are coupled to one another as illustrated in FIG. 3. Each of the nodes is an electronic device included in the wireless network 100. As illustrated, there are several types of nodes in the wireless network 100. Depending on the capabilities of the electronic device 10, the electronic device 10 may be one or more of any of the types of nodes. The particular types of nodes included in the wireless network 100 include routers 102 (collectively referring to routers 102 (e.g., routers that are not further classified as discussed below), thread leader 102A, and border router 102B) and end devices 104 (collectively referring to end devices 104A, 104B, 104C, 104D). Routers 102 include nodes that forward packets for network devices, provide secure commissioning services for devices attempting to join the wireless network 100, and keep their transceiver(s) enabled at all times. End devices 104 include nodes that do not forward packets for other network devices, communicate (primarily) with a single router 102, and may disable their transceiver(s) to reduce power. As discussed below, routers 102 and some end devices 104 may also be classified as full Thread devices, while other end devices may be classified as minimal Thread devices. A full Thread device may always have its radio on, maintain IPv6 address mappings, and subscribe to an all-routers multicast address. Minimal Thread devices may not subscribe to the all-routers multicast address and forward their messages to a router 102 (or an end device 104 that is functioning as a router 102).

Within the classification of routers 102, there may be several types of routers 102. For example, a router 102 may include a thread leader 102A, which manages the other routers in the wireless network 100. A router 102 may also include a border router 102B, which is a device that can forward data to another network 106, such as a network other than a Thread network (e.g., a Wi-Fi® network). Routers 102 may include full Thread devices.

Within the classification of end devices 104, there are router eligible end devices 104A, full end devices 104B, minimal end devices 104C, and sleepy end devices 104D. Router eligible end devices 104A and full end devices 104B may include full Thread devices. More specifically, router eligible end devices 104A may include end devices 104 that can be promoted to function as a router 102, while full end devices 104B may include end devices 104 that are full Thread devices but cannot be promoted to be a router 102. Minimal end devices 104C and sleepy end devices 104D may include minimal Thread devices. In particular, a minimal end device 104C does not need to poll for messages sent from the router 102 to which the minimal end device 104C is coupled, and the minimal end device's 104C transceiver may always be on. A sleepy end device 104D may include an end device 104 that is typically in sleep and wakes up occasionally to poll for messages from the router 102 to which it is coupled. In an embodiment, the electronic device 10 may be capable of routing (e.g., a router 102, a router eligible end device 104A, a full end device 104B, and so on). In another embodiment, the electronic device 10 may include an accessory device not capable of routing (e.g., a minimal end device 104C, a sleepy end devices 104D, and so on).

The wireless network 100 may be implemented indoors (e.g., within a dwelling or office space), outdoors, or both. The nodes may include electrical devices including, but not limited to, the electronic devices listed above that the electronic device 10 may be. For instance, the nodes (which include the electronic device 10) may be a phone, tablet, computer, a portable electronic or handheld electronic, a wearable electronic device, a smart speaker, home automation equipment (including, but not limited to switches, outlets, controllers, irrigation or sprinkler system equipment, sensors, lights, thermostats), a smart appliance, a smart door lock, wireless routers, network extenders, or power equipment), or any combination thereof.

Figure 4:
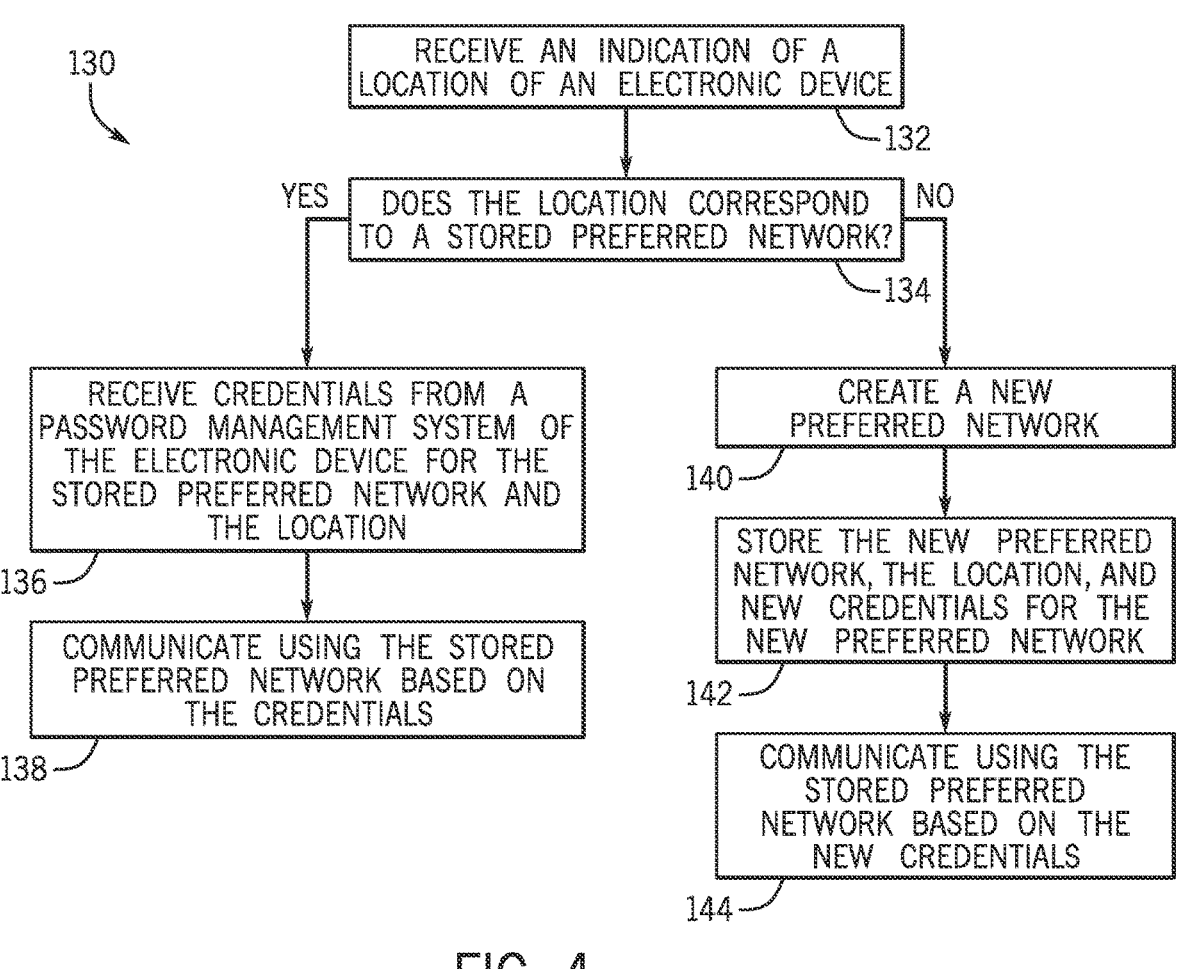
FIG. 4 is a flow diagram of a process for joining the electronic device of FIG. 1 to a preferred network, according to embodiments of the present disclosure.

Keeping this in mind, FIG. 4 is a flow diagram of a process 130 for joining the electronic device 10 to a preferred network (e.g., a preferred Thread network), according to embodiments of the present disclosure. The preferred network may include a wireless network (e.g., a wireless mesh network) having multiple devices coupled (e.g., wirelessly coupled) to one another at a specific location. The preferred network may be designated, in the password management system 58, as a network that a user may couple their devices at the specific location to. That is, the electronic device 10 may prioritize the preferred network when joining (by requesting the network credentials of the preferred network) at the specific location over non-preferred networks. In this manner, the preferred network may enable communication between the electronic devices 10 on a single network (the preferred network) at the specific location. For example, the network 100 of FIG. 3 may include the preferred network if designated as such and/or meets conditions involved for the preferred network (e.g., the network 100 is stored in the password management system 58 and designated in the password management system 58 as the preferred network).

Any suitable device (e.g., a controller) that may control components of the electronic device 10, such as the processor 12 or the transceiver 30, may perform the process 130. In some embodiments, the process 130 may be implemented by executing instructions stored in a tangible, non-transitory, computer-readable medium, such as the memory 14 or the storage 16, using the processor 12 or the transceiver 30. For example, the process 130 may be performed at least in part by one or more software components, such as an operating system of the electronic device 10, one or more software applications of the electronic device 10, and the like. While the process 130 is described using steps in a specific sequence, it should be understood that the present disclosure contemplates that the described steps may be performed in different sequences than the sequence illustrated, and certain described steps may be skipped or not performed altogether.

At process block 132, the processor 12 receives (e.g., via the transceiver 30) an indication of a location of the electronic device 10. The location may include a network signature of a router 102 to which the electronic device 10 is coupled. The router 102 may include any electronic device that may route data from a source to a destination. The network signature of the router may include an IP address (e.g., Internet Protocol version 4 (IPv4), Internet Protocol version 6 (IPv6), and so on), a media access control (MAC) address, or any other suitable address format. Additionally or alternatively, the indication of the location of the electronic device 10 may include the service set identifier (SSID) (e.g., a set of characters uniquely naming the network 100) of the router 102.

After the processor 12 receives the indication of the location, at process block 134, the processor 12 determines whether the location corresponds to a stored preferred network 100. That is, the processor 12 determines whether the stored preferred network 100 exists at the location of the electronic device 10 by fetching credentials from the network 100. If the stored preferred network 100 exists at the location of the electronic device 10, the process 130 may proceed to process block 136.

At process block 136, the processor 12 receives credentials from the password management system 58 of the electronic device 10 for the stored preferred network 100 and the location. The credentials may include a Border Agent identifier (e.g., a unique identifier for an active border router device), a network name, a personal area network identification (PANID) (e.g., a 16-bit identifier for the network 100), an extended PANID (e.g., a 64-bit identifier for the network 100), an active operational dataset (e.g., operational parameters for the network 100 in the form of a hex string), a network key (e.g., a password or code used to access the network 100), a pre-shared key for the Commissioner (PSKC) (e.g., a secret key that has previously been established between devices authorized to use the secret key), and/or a channel (e.g., the network radio channel). The received credentials may be stored in the password management system 58 of the electronic device 10 and designated (e.g., marked and/or labeled) as the preferred network 100 for the location. Additionally, at process block 138, the processor 12 uses the stored credentials to join the stored preferred network 100 and communicate using the stored preferred network 100.

With the foregoing in mind, and referring back to the process block 134, if the location does not correspond to the stored preferred network 100, the processor 12 proceeds to process block 140. At process block 140, the processor 12 creates a new preferred network 100. That is, the processor 12 creates new credentials that correspond to the new preferred network 100 that the processor 12 created. The new credentials may include the indication of the location (e.g., the network signature and/or the SSID), and the parameters described above with respect to the credentials.

Once the processor 12 has created the new credentials, at process block 142, the processor 12 stores the new preferred network 100, the location, and the new credentials in the password management system 58 of the electronic device 10. At process block 144, the processor 12 communicates using the stored preferred network 100 based on the new credentials. Further, any additional electronic device may join and communicate using the preferred stored network 100 by requesting the new credentials, receiving the new credentials, and joining the preferred stored network 100. In this manner, the process 130 may enable the electronic device 10 to join the preferred stored network 100.

In some embodiments, the processor 12 provides an application programming interface (API) gateway. The API may periodically (e.g., two times a day, four times a day, or at any other suitable frequency) determine whether communication is being performed via the stored preferred network 100. If the API gateway determines that the communication is being performed via a non-preferred network, then the API gateway may cause the communication to be performed via the stored preferred network 100. In this manner, the electronic device 10, and any additional electronic device coupled to the preferred stored network 100 may maintain their communication on the same stored preferred network 100.

Figure 5:
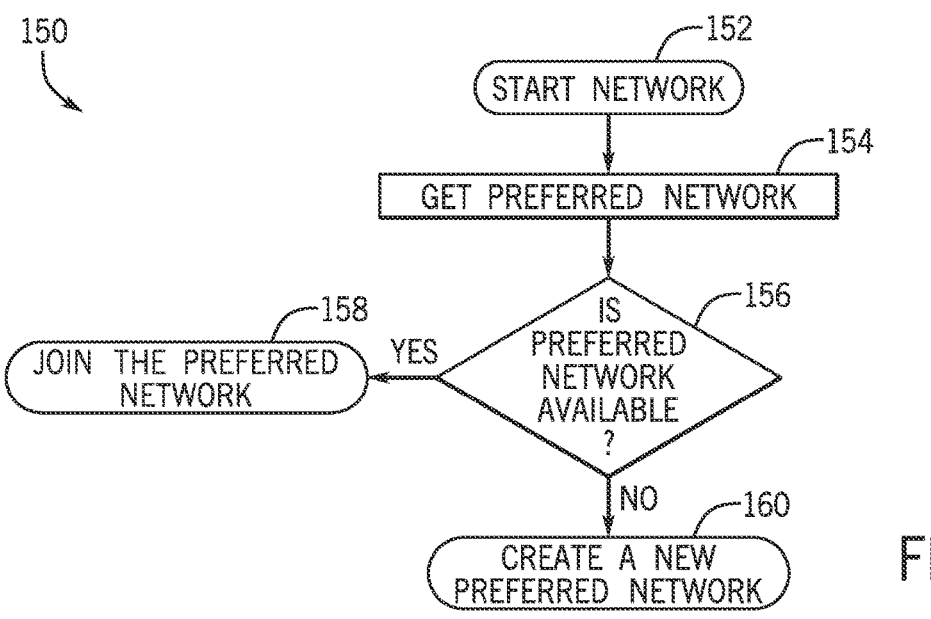
FIG. 5 is a flow diagram of a process for the electronic device of FIG. 1 joining the preferred network or creating a new preferred network, according to embodiments of the present disclosure.

FIG. 5 is a flow diagram of a process 150 for the electronic device 10 of FIG. 1 joining the preferred network 100 or creating the preferred network 100, according to embodiments of the present disclosure. Any suitable device (e.g., a controller) that may control components of the electronic device 10, such as the processor 12 or the transceiver 30, may perform the process 150. In some embodiments, the process 150 may be implemented by executing instructions stored in a tangible, non-transitory, computer-readable medium, such as the memory 14 or the storage 16, using the processor 12 or the transceiver 30. For example, the process 150 may be performed at least in part by one or more software components, such as an operating system of the electronic device 10, one or more software applications of the electronic device 10, and the like. While the process 150 is described using steps in a specific sequence, it should be understood that the present disclosure contemplates that the described steps may be performed in different sequences than the sequence illustrated, and certain described steps may be skipped or not performed altogether.

As an example, the user may be setting up the electronic device 10 for the first time. At process block 152, the processor 12 starts the network. At process block 154, the processor 12 implements a call to retrieve the preferred network 100 on the electronic device 10. That is, as mentioned above, the processor 12 requests the network signature of the location of the network the electronic device 10 is coupled to. Moreover, the processor 12 requests the credentials (e.g., the network name, the extended PANID, the active operational dataset, and so on) for the preferred network 100 from the password management system 58.

At process block 156, the electronic device 10 determines if the preferred network 100 is available based on receiving the credentials for the preferred network 100. The preferred network 100 may be available if it exists at the location of the electronic device 10 and/or network coverage is provided by the preferred network 100 at the location. If the credentials for the preferred network 100 are found in the password management system 58, at process block 158, the processor 12 receives the credentials and join the preferred network 100.

In some embodiments, where the electronic device 10 is the accessory device, the processor 12 verifies (e.g., confirms) whether routing devices are running on the preferred network 100 before joining the preferred network 100. The processor 12 sends a multicast domain name system (mDNS) request. If the processor 12 receives verification that the routing devices are running on the preferred network 100, then the electronic device 10 may join the preferred network 100. If the processor 12 does not receive the verification that the routing devices are coupled to the preferred network 100, then the electronic device 10 may not join the preferred network 100. More detail with regard to the mDNS request will be discussed below.

With the foregoing in mind, and referring back to the process block 156, the processor 12 determines the preferred network 100 is unavailable based on not receiving the credentials for the preferred network. Thus, at process block 160, the processor 12 creates the new preferred network 100. That is, where the electronic device 10 is a device of routing (e.g., a router 102, a router eligible end device 104A, a full end device 104B, and so on), the processor 12 creates the new preferred network 100 and store the new preferred network 100, the location, and new credentials for the new preferred network 100. In this manner, the process 150 may enable the electronic device 10 to join the preferred network 100 or create the preferred network 100.

Figure 6:
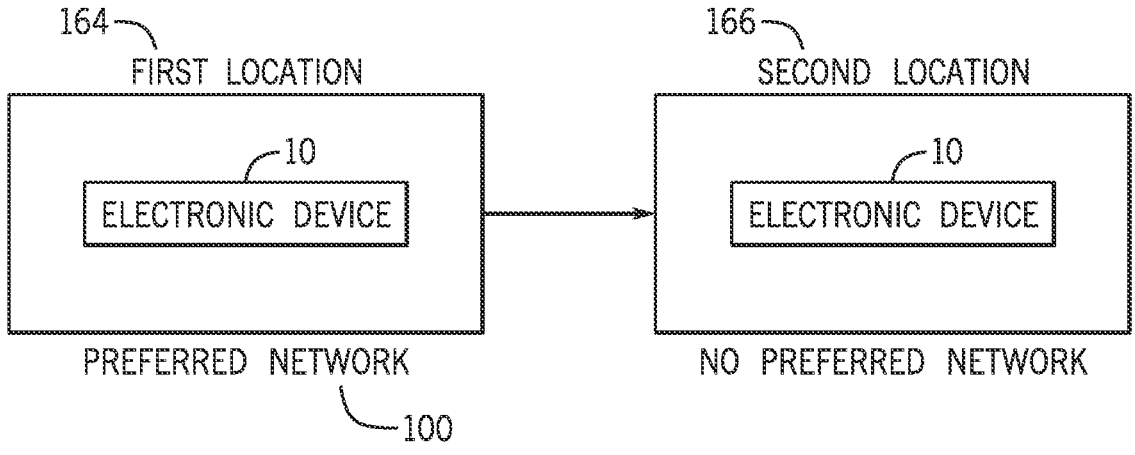
FIG. 6 is a block diagram of the electronic device of FIG. 1 physically moving from a first location having the pre-ferred network to a second location without the preferred network, according to embodiments of the present disclo-sure.

FIG. 6 is a block diagram of the electronic device 10 of FIG. 1 physically moving from a first location 164 having the preferred network 100 to a second location 166 without the preferred network 100. As described above with respect to FIG. 5, at the first location 164, the processor 12 of the electronic device 10 requests the credentials for the preferred network 100 from the password management system 58. The preferred network 100 may be available at the first location 164, and thus the processor 12 of the electronic device 10 receives the credentials and joins the preferred network 100 (e.g., as described in process block 158 above).

At a subsequent time, the electronic device 10 may physically move from the first location 164 to the second location 166. For example, a user may move from one house to another (e.g., change residences) and bring the electronic device 10 with them. The preferred network 100 may be unavailable (e.g., not exist or provide network coverage) at the second location 166. The processor 12 requests the credentials for the preferred network 100 from the password management system 58 at the second location 166 and may determine that the preferred network 100 is not available based on not receiving the credentials for the preferred network 100 (e.g., as described in process block 156 above). Therefore, in the case in which the electronic device 10 is capable of routing (e.g., a router 102, a router eligible end device 104A, a full end device 104B, and so on), the processor 12 of the electronic device 10 creates the new preferred network (e.g., as described in process block 160 above). Further, the processor 12 of electronic device 10 stores the new preferred network, the second location, and new credentials for the new preferred network. The password management system 58 of the electronic device 10 may store a first entry for the preferred network 100 of the first location 164 and a second entry for the new preferred network of the second location 166.

As such, when the electronic device 10 is located within the first location 164, the electronic device 10 may receive the credentials for the preferred network 100 and communicate using the preferred network 100. Moreover, when the electronic device 10 is moved to the second location 166, the electronic device 10 may receive the new credentials and communicate using the new preferred network.

Figure 7:
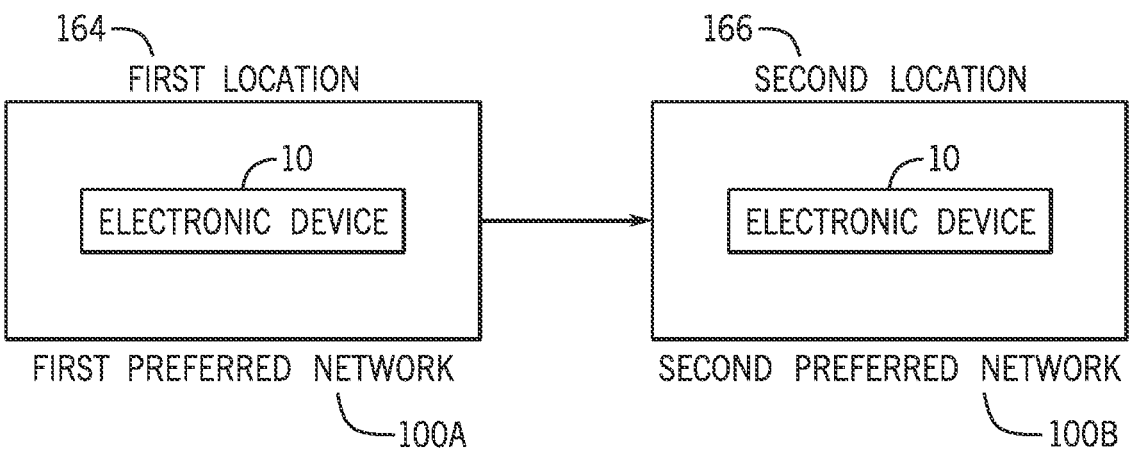
FIG. 7 is a block diagram of the electronic device of FIG. 1 physically moving from a first location having a first preferred network to a second location having a second preferred network, according to embodiments of the present disclosure.

FIG. 7 is a block diagram of the electronic device 10 of FIG. 1 physically moving from the first location 164 having a first preferred network 100A to the second location 166 having a second preferred network 100B. As described above with respect to FIG. 5, at the first location 164, the processor 12 of the electronic device 10 requests the credentials for the first preferred network 100A from the password management system 58 (e.g., as described in process block 156 above). The first preferred network 100A may be available at the first location 164, and thus the processor 12 of the electronic device 10 receives the credentials and joins the first preferred network 100A (e.g., as described in process block 158 above).

At a subsequent time, the electronic device 10 may physically move from the first location 164 to the second location 166. The second location 166 may include the second preferred network 100B. The processor 12 requests the credentials for the new preferred network from the password management system 58 and receives the credentials (as described in process block 156 above). Thus, the electronic device 10 may join the second preferred network 100B and communicate via the second preferred network 100B while located in the second location 166 (e.g., as described in process block 158 above).

Figure 8:
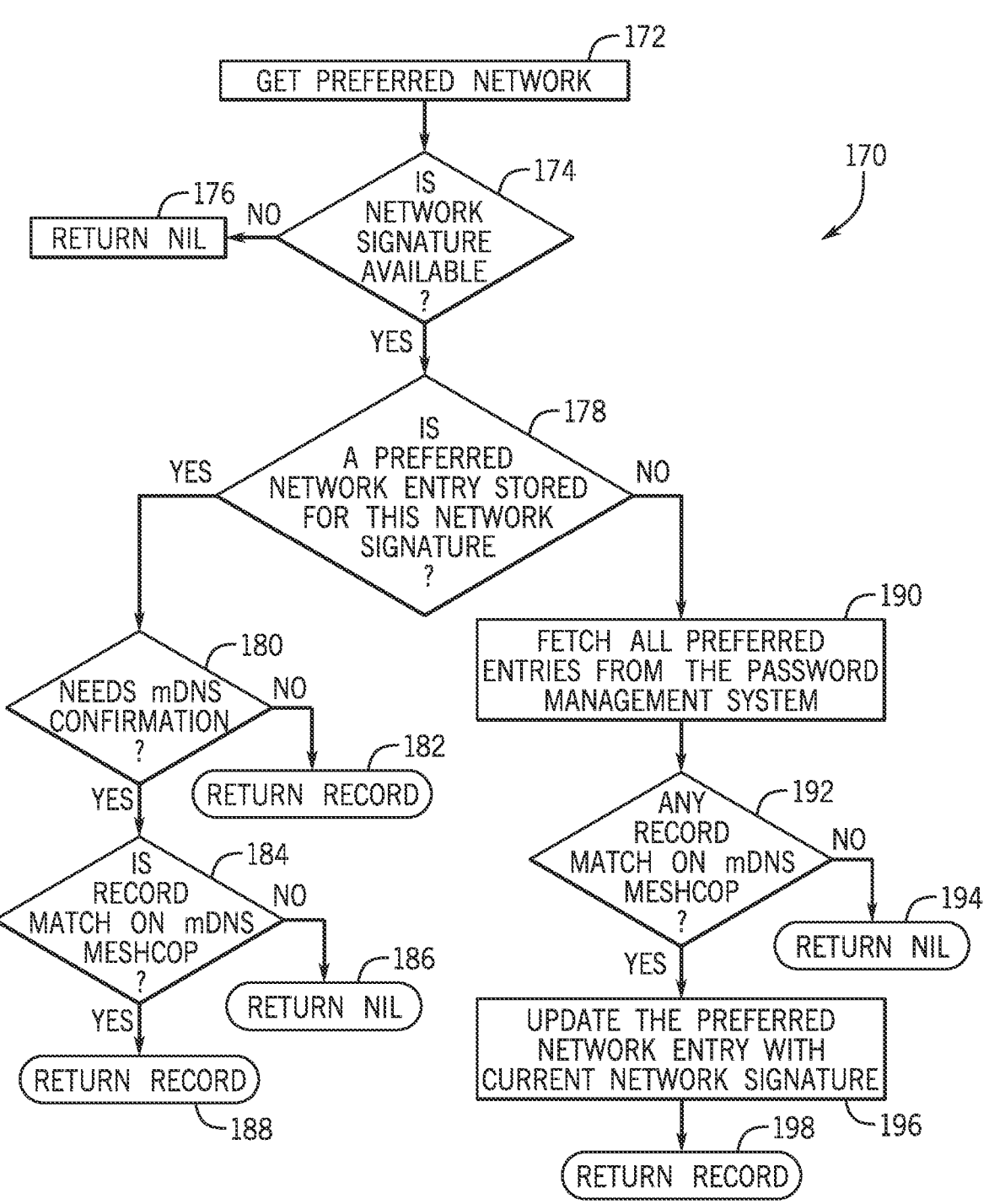
FIG. 8 is a flow diagram of a process for the electronic device of FIG. 1 to retrieve the preferred network, according to embodiments of the present disclosure.

FIG. 8 is a flow diagram of a process 170 for the electronic device 10 of FIG. 1 to retrieve the preferred network 100, according to embodiments of the present disclosure. Any suitable device (e.g., a controller) that may control components of the electronic device 10, such as the processor 12 or the transceiver 30, may perform the process 170. In some embodiments, the process 170 may be implemented by executing instructions stored in a tangible, nontransitory, computer-readable medium, such as the memory 14 or the storage 16, using the processor 12 or the transceiver 30. For example, the process 170 may be performed at least in part by one or more software components, such as an operating system of the electronic device 10, one or more software applications of the electronic device 10, and the like. While the process 170 is described using steps in a specific sequence, it should be understood that the present disclosure contemplates that the described steps may be performed in different sequences than the sequence illustrated, and certain described steps may be skipped or not performed altogether.

At process block 172, the processor 12 implements a call to retrieve the preferred network 100 on the electronic device 10. At process block 174, the processor 12 determines if the network signature is available at the location of the electronic device 10. As described herein, the network signature may include the IP address, the MAC address, the SSID, or any other suitable address format. If the network signature is unavailable at the location of the electronic device 10, the process 170 may end at process block 176 (e.g., by returning nil). However, if there is a network signature available at the location of the electronic device 10, the process 170 may proceed to process block 178.

At process block 178, the processor 12 determines if a preferred network entry is stored for the network signature of the location of the electronic device 10. The preferred network entry may include the credentials and the network signature for the location. If the preferred network entry is stored for the network signature, the process 170 may proceed to process block 180. At process block 180, the processor 12 determines whether mDNS confirmation is needed (e.g., whether to send an mDNS request). If the electronic device 10 is capable of routing (e.g., a router 102, a router eligible end device 104A, a full end device 104B, and so on), then the processor 12 does not send the mDNS request and may proceed to process block 182. At process block 182, the processor 12 retrieves the preferred network entry (e.g., return record), including the credentials, from the password management system 58 based on the network signature.

With the foregoing in mind, and referring back to process block 180, if the electronic device 10 is the accessory device not capable of routing, then the processor 12 sends the mDNS request to verify whether the routing devices are coupled to the preferred network 100. The routing devices may advertise their presence using any suitable protocol used for commissioning wireless mesh networks. For example, the protocol may include a mesh commissioning protocol (MeshCoP) user datagram protocol (UDP). The routing devices may each advertise their Border Agent identification, network name, extended PANID, and other parameters over the MeshCoP. Therefore, the processor 12 sends the mDNS request (e.g., a MeshCoP UDP service discovery) to scan for the routing devices. The processor 12 then receives the parameters advertised by each device of the routing devices.

Additionally, the processor 12 compares the parameters advertised by each device of the one or more devices to the credentials stored within the password management system 58. At process block 184, the processor 12 determines whether there is a record match on mDNS meshcop (e.g., if the parameters advertised by each device of the one or more devices match the credentials stored within the password management system 58). If the processor 12 determines there is not a record match on mDNS meshcop (e.g., the parameters advertised by each device of the one or more devices do not match the credentials stored within the password management system 58), then that may indicate there are no routing devices coupled to the preferred network 100. Thus, at process block 186, the process 170 may end (e.g., return nil).

Referring back to process block 184, if the processor 12 determines there is a record match on mDNS meshcop (e.g., the parameters advertised by each device of the one or more devices match the credentials stored with the password management system 58), then that may indicate the routing devices are coupled to the preferred network 100. Therefore, at process block 188, the processor 12 retrieves the preferred network entry, including the credentials, from the password management system 58.

With the foregoing in mind and referring back to process block 178, if the preferred network entry is not stored for the network signature of the location of the electronic device 10, the process 170 may proceed to process block 190. At process block 190, the processor 12 fetches a list of preferred network entries from the password management system 58. Moreover, the list of preferred network entries may include the credentials of a previously stored preferred network 100.

At process block 192, the processor 12 determines if the list of preferred network entries indicates any record match on the mDNS meshcop. That is, the processor 12 may send the mDNS request to scan for the routing devices. The processor 12 then receives the parameters advertised by each device of the routing devices. Further, the processor 12 compares the parameters of the one or more devices to the list of the preferred network entries to determine whether the record match exists. In an embodiment, the record match may indicate the routing devices were coupled to the previously stored preferred network but may have moved from the first location 164, to the second location 166. In another embodiment, the record match may indicate the routing devices were previously connected to the previously stored preferred network, which may have been provided by a different service provider, and thus may have provided a different network signature. If the record match does not exist, then at process block 194, the process 170 may end.

If the record match exists, the process 170 may proceed to process block 196. The processor 12 retrieves the credentials associated with the previously stored preferred network 100 from the list of the preferred network entries. At process block 196, the processor 12 updates the preferred network entry with the current network signature (e.g., the network signature available at the location of the electronic device 10). Further, at process block 198, the processor 12 retrieves the updated preferred network entry, including the credentials of the previously stored preferred network and the updated network signature. In this manner, the electronic device 10 and the routing devices may receive the credentials and use the credentials to join the previously stored preferred network. Moreover, any additional number of devices may join the previously stored preferred network by retrieving the updated preferred network entry. As such, the process 170 may enable the electronic device 10 to retrieve the preferred network 100.

Figure 9:
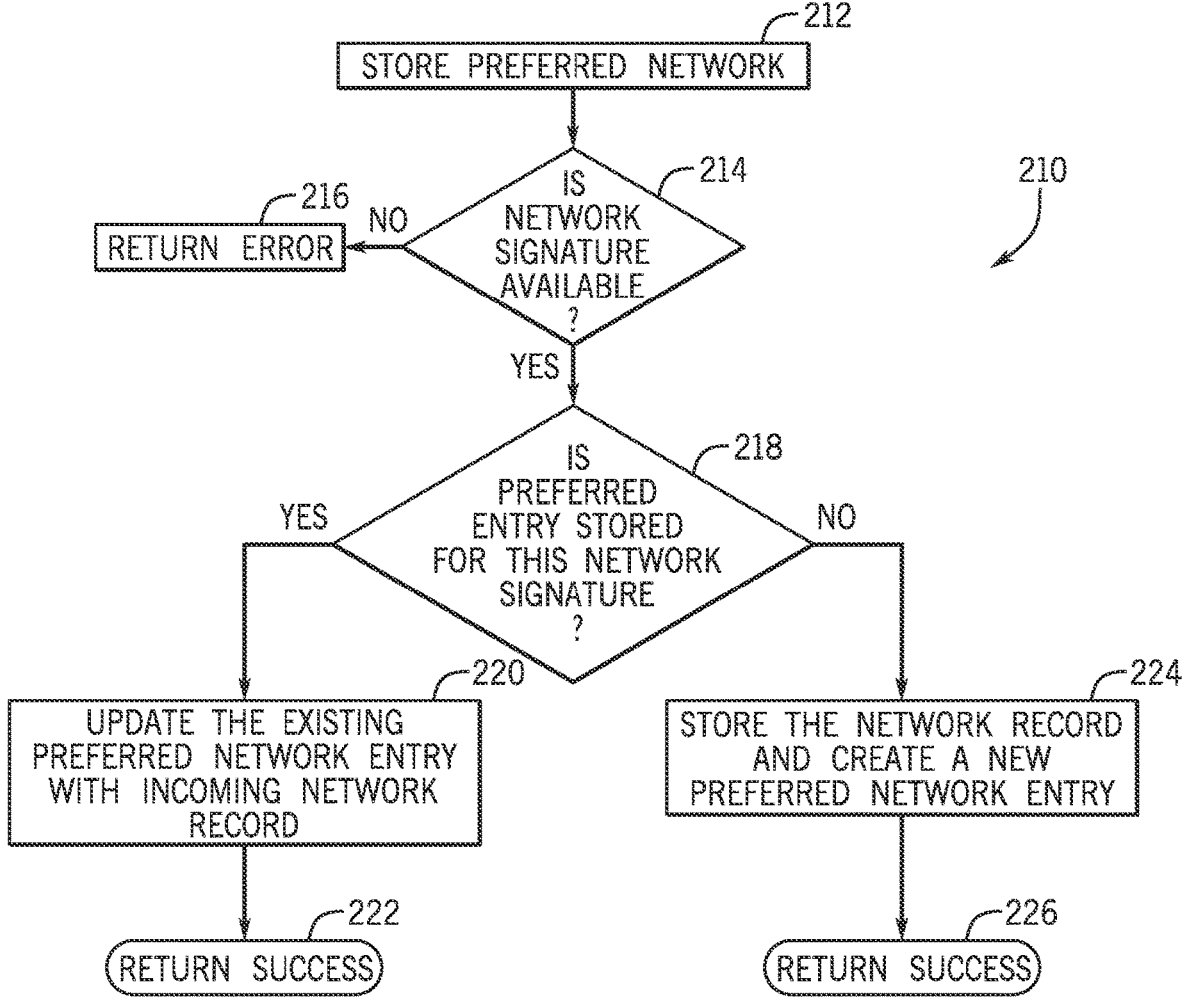
FIG. 9 is a flow diagram of a process for the electronic device of FIG. 1 to store the preferred network, according to embodiments of the present disclosure.

FIG. 9 is a flow diagram of a process 210 for the electronic device 10 of FIG. 1 to store the preferred network 100, according to embodiments of the present disclosure. Any suitable device (e.g., a controller) that may control components of the electronic device 10, such as the processor 12 or the transceiver 30, may perform the process 210. In some embodiments, the process 210 may be implemented by executing instructions stored in a tangible, non-transitory, computer-readable medium, such as the memory 14 or the storage 16, using the processor 12 or the transceiver 30. For example, the process 210 may be performed at least in part by one or more software components, such as an operating system of the electronic device 10, one or more software applications of the electronic device 10, and the like. While the process 210 is described using steps in a specific sequence, it should be understood that the present disclosure contemplates that the described steps may be performed in different sequences than the sequence illustrated, and certain described steps may be skipped or not performed altogether.

At process block 212, the processor 12 implements a call to store the preferred network 100 on the electronic device 10. At process block 214, the processor 12 determines if the network signature is available at the location of the electronic device 10. If there the network signature is unavailable at the location of the electronic device 10, the process 210 may return an error at process block 216. That is, the error may indicate the process 210 could not complete a task (e.g., storing the preferred network 100) successfully and thus could not produce the expected output. However, if there is a network signature available at the location of the electronic device 10, the process 210 may proceed to process block 218.

At process block 218, the processor 12 determines if the preferred network entry is stored for the network signature of the location of the electronic device 10. If the preferred network entry is stored for the network signature, the process 210 may proceed to process block 220. At process block 220, the processor 12 updates the preferred network entry with an incoming network record (e.g., preferred network, network signature, credentials). Moreover, at process block 222 the process 210 may return success. That is, the success may indicate the process 210 has successfully completed the task (e.g., storing the preferred network 100). The updated preferred network entry may indicate the network record most recently obtained by the preferred network entry. Further, each time a new electronic device is coupled to the preferred network 100, the network record of the new electronic device becomes the preferred network entry. Therefore, when an additional new electronic device requests the credentials, the additional new electronic device receives the updated preferred network entry.

With the foregoing in mind, and referring back to process block 218, if the preferred entry is not stored for the network signature of the location of the electronic device 10, the process 210 may proceed to process block 224. As described herein, if the preferred network 100 does not exist at the location of the electronic device 10, the processor 12 creates the new preferred network 100. At process block 224, the processor 12 stores the network record (e.g., preferred network, network signature, credentials) and creates a new preferred network entry. That is, the stored network record may be designated as the new preferred network entry. Therefore, at process block 226, the process 210 may return success. In this manner, the process 210 may enable the electronic device 10 to store the preferred network 100.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . ." or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. One or more tangible, non-transitory computer-readable media storing instructions that, when executed by one or more processors of an electronic device, are configured to cause the one or more processors to:

receive an indication of a location of the electronic device;

receive credentials from a password management system of the electronic device for a preferred network and the location based on the preferred network existing at the location;

create a new preferred network and new credentials, and store the new preferred network, the location, and the new credentials in the password management system based on the preferred network not existing at the location; and cause the electronic device to communicate using the preferred network based on the credentials or the new preferred network based on the new credentials.

2. The one or more tangible, non-transitory computer-readable media of claim 1, wherein the instructions, when executed by the one or more processors, are configured to cause the one or more processors to:

determine that a network router comprises a previously stored identifier based on the preferred network not existing at the location; and create the new preferred network using previously stored credentials associated with the previously stored identifier for the location.

3. The one or more tangible, non-transitory computer-readable media of claim 1, wherein the instructions, when executed by the one or more processors, are configured to cause the one or more processors to:

cause transmission of a multicast domain name system request to verify the electronic device exists based on the location corresponding to the preferred network; and receive the credentials of the electronic device for the preferred network.

4. The one or more tangible, non-transitory computer-readable media of claim 1, wherein the instructions, when executed by the one or more processors, are configured to cause the one or more processors to:

provide an application programming interface (API) gateway configured to periodically determine whether communication is being performed using the preferred network;

determine, using the API gateway, that the communication is being performed using a non-preferred network; and cause, using the API gateway, the communication to be performed via the preferred network based on the communication being performed using the non-preferred network.

5. The one or more tangible, non-transitory computer-readable media of claim 1, wherein the instructions, when executed by the one or more processors, are configured to cause the one or more processors to:

receive an additional indication of an additional location of an additional electronic device;

receive additional credentials from an additional password management system of the additional electronic device for an additional preferred network and the additional location based on the additional location corresponding to the additional preferred network; and cause the electronic device to communicate using the additional preferred network based on the additional credentials.

6. The one or more tangible, non-transitory computer-readable media of claim 1, wherein the instructions, when executed by the one or more processors, are configured to cause the one or more processors to:

receive an additional indication of an additional location of an additional electronic device;

create an additional new preferred network and additional new credentials, and store the additional new preferred network, the additional location, and the additional new credentials in the password management system based on the additional new preferred network not existing at the additional location; and cause the electronic device to communicate using the additional new preferred network based on the additional new credentials.

7. The one or more tangible, non-transitory computer-readable media of claim 1, wherein the location comprises a network signature of the electronic device.

8. The one or more tangible, non-transitory computer-readable media of claim 1, wherein the password management system is stored in a network-based storage.

9. A method to be performed by processing circuitry of an electronic device comprising:

receiving an indication of a location of the electronic device;

receiving credentials from a password management system of the electronic device for a preferred network and the location based on the preferred network existing at the location;

creating a new preferred network and new credentials, and storing the new preferred network, the location, and the new credentials in the password management system based on the preferred network not existing at the location; and causing the electronic device to communicate using the preferred network based on the credentials or the new preferred network based on the new credentials.

10. The method of claim 9, comprising:

determining that a network router comprises a previously stored identifier based on the preferred network not existing at the location; and creating the new preferred network using previously stored credentials associated with the previously stored identifier for the location.

11. The method of claim 9, comprising:

causing transmission of a multicast domain name system request to verify the electronic device exists based on the location corresponding to the preferred network; and receiving the credentials of the electronic device for the preferred network.

12. The method of claim 9, comprising:

providing an application programming interface (API) gateway configured to periodically determine whether communication is being performed using the preferred network;

determining, using the API gateway, that the communication is being performed using a non-preferred network; and causing, using the API gateway, the electronic device to communicate using the preferred network based on the communication being performed using the non-preferred network.

13. The method of claim 9, comprising:

receiving an additional indication of an additional location of an additional electronic device;

receiving additional credentials from an additional password management system of the additional electronic device for an additional preferred network and the additional location based on the additional location corresponding to the additional preferred network; and causing the electronic device to communicate using the additional preferred network based on the additional credentials.

14. The method of claim 9, comprising:

receiving an additional indication of an additional location of an additional electronic device;

creating an additional new preferred network and additional new credentials, and store the additional new preferred network, the additional location, and the additional new credentials in the password management system based on the additional new preferred network not existing at the additional location; and causing the electronic device to communicate using the additional new preferred network based on the additional new credentials.

15. The method of claim 9, wherein the location comprises a network signature of the electronic device.

16. An electronic device comprising:

a transmitter;

a receiver;

a memory storing a password management system; and processing circuitry communicatively coupled to the transmitter, the receiver, and the memory, the processing circuitry configured to:

cause the receiver to receive an indication of a location of the electronic device;

cause the receiver to receive credentials from the password management system of the electronic device for a preferred network and the location based on the preferred network existing at the location;

create a new preferred network and new credentials, and store the new preferred network, the location, and the new credentials in the password management system based on the preferred network not existing at the location; and cause the electronic device to communicate using the preferred network based on the credentials or the new preferred network based on the new credentials.

17. The electronic device of claim 16, wherein the processing circuitry is configured to:

determine that a network router comprises a previously stored identifier based on the preferred network not existing at the location; and create the new preferred network using previously stored credentials associated with the previously stored identifier for the location.

18. The electronic device of claim 16, wherein the processing circuitry is configured to:

cause the transmitter to transmit a multicast domain name system request to verify the electronic device exists based on the location corresponding to the preferred network; and cause the receiver to receive the credentials of the electronic device for the preferred network.

19. The electronic device of claim 16, wherein the processing circuitry is configured to:

provide an application programming interface (API) gateway configured to periodically determine whether communication is being performed using the preferred network;

determine, using the API gateway, that the communication is being performed using a non-preferred network; and cause, using the API gateway, the electronic device to communicate using the preferred network based on the communication being performed using the non-preferred network.

20. The electronic device of claim 16, wherein the memory stores the password management system in a network-based storage.

* * * * *